United States Patent
Ramey et al.

(10) Patent No.: US 6,386,239 B1
(45) Date of Patent: May 14, 2002

(54) TRANSMISSION HOSE FOR A VEHICLE

(75) Inventors: Marty A. Ramey, Buchanan; Jeffrey D. Harris, Ridgely, both of TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/954,565

(22) Filed: Sep. 12, 2001

(51) Int. Cl.$^7$ .................................................. F16L 11/00
(52) U.S. Cl. ........................ 138/125; 138/126; 428/36.91
(58) Field of Search .............................. 138/125, 126, 138/123, DIG. 3; 428/36.91

(56) References Cited

U.S. PATENT DOCUMENTS

| | | |
|---|---|---|
| 4,366,746 A | 1/1983 | Rosecrans ............... 138/125 X |
| 4,488,921 A | 12/1984 | Dougherty ................. 156/172 |
| 4,905,735 A | 3/1990 | Akiyoshi ..................... 138/126 |
| 5,380,571 A | 1/1995 | Ozawa et al. ........... 138/137 X |
| 5,639,528 A * | 6/1997 | Feit et al. ............... 138/125 X |
| 6,261,657 B1 * | 7/2001 | Ainsworth et al. ..... 138/141 X |

* cited by examiner

*Primary Examiner*—Patrick Brinson
(74) *Attorney, Agent, or Firm*—Rader, Fishman & Grauer PLLC

(57) ABSTRACT

A three-layer transmission hose for use in a vehicle is disclosed. The transmission hose includes a reinforcement layer sandwiched between an inner layer and an outer layer where the inner layer is made up of a blend of a poylethylene vinylacetate (EVM) and a chlorinated polyethylene (CPE). The outer layer may be made of the same or different material as the inner layer. A method of making a transmission hose from a blend of EVM and CPE is also disclosed.

7 Claims, 1 Drawing Sheet

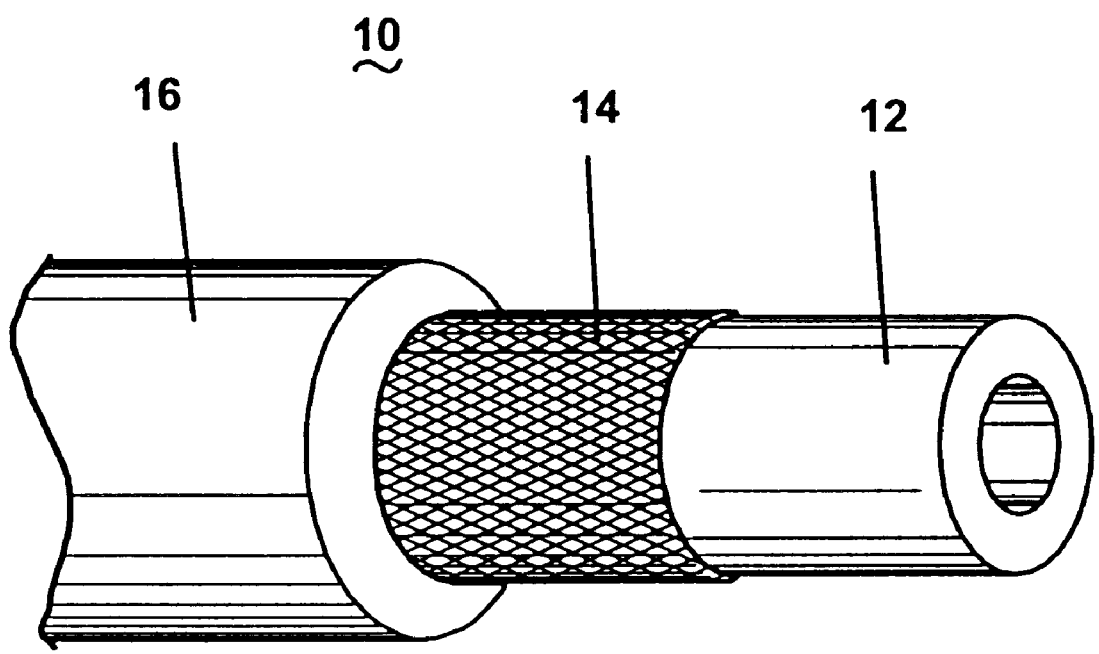

TRANSMISSION HOSE FOR A VEHICLE

BACKGROUND OF THE INVENTION

1. Field of the Invention

The present invention relates to an improved hose for use in motor vehicles, and more particularly, to a hose for use in transmission systems of motor vehicles.

2. Description of the Prior Art

Three-, four, and five-layer hoses are known to be used in the transmission system of motor vehicles. An inner layer is in direct contact with the fluid to be transported through the hose. An outer layer is a protective covering which also strengthens the hose. One or more layers located between the inner and outer layers provide reinforcing strength to the hose.

When choosing materials for a transmission hose, a number of considerations must be balanced against one another. The transmission hose must be able to withstand the elevated temperatures of the transmission fluid for long periods of time. The slower the transmission hose is "aged" by the heated transmission fluid, the longer the useful life of the hose. A transmission system typically relies on hydraulic forces to carry out its function, thus leading to the need for transmission hoses to be able to withstand high pressures. A transmission hose must also be flexible so that it can be placed in the motor vehicle where convenient for the manufacturer. Other considerations include the amount the hose ages during storage, processing characteristics, and manufacturing costs.

In an effort to meet the aforementioned considerations with respect to improving the life and operating characteristics of pressurized flexible hose, a number of elastomers and rubbers have been used, such as ethylene propylene rubber, butyl rubber and polychloroprene rubber. While certain such elastomers and rubbers are usable with petroleum base fluids and others are usable only with non-petroleum base fluids, these elastomers age during storage and use, often can not be used with a wide range of fluids of various chemical composition, and may rapidly deteriorate at elevated temperatures.

Accordingly, there is a need to provide an improved fuel hose which has low impermeability and high flexibility while also being inexpensive to manufacture.

SUMMARY OF THE INVENTION

The present invention is a three-layer transmission hose for use in a vehicle, which includes a reinforcement layer sandwiched between an inner layer and an outer layer in which one or both layers are made of a blend of a poylethylene/vinylacetate (EVM) and a chlorinated polyethylene (CPE).

BRIEF DESCRIPTION OF THE DRAWING

The drawing is a prospective end view of a transmission hose.

DETAILED DESCRIPTION OF THE PREFERRED EMBODIMENTS

Referring to the drawing, a transmission hose 10 according to the present invention is composed of an inner layer 12 made of a chlorinated polyethylene (CPE) combined with a polyethylene/vinylacetate (EVM), a fiber reinforcing intermediate layer 14 formed on the inner layer 12, and an outer layer 16 formed on the fiber reinforcing layer 14.

The material used for forming the inner layer 12 is a combination of CPE and EVM. The CPE is desirable because it is flexible while also being able to withstand the pressures and temperatures generated in the transmission system by commonly used fluids. However, CPE has a relatively high viscosity that makes it difficult to process. Furthermore, CPE has mediocre heat aging characteristics which means hoses made of CPE tend to wear out quickly. Another drawback of CPE is that it does not bind well to the typical reinforcing layer.

EVM is the common abbreviation for a group of elastomers or rubbers in which vinylacetate groups have been added to the backbone of the polyethylene chain. As the percentage of vinylacetate on the polyethylene backbone increases, the composition switches from a thermoplastic to an elastomer. As the polyethylene backbone nears saturation with vinylacetate, the composition switches back to a thermoplastic. Typically, the middle range, where the composition is an elastomer, is called EVM. The range of elastomeric properties is between 33% and 80% vinylacetate on the polyethylene backbone.

In contrast to CPE, EVM is a low viscosity material and also has improved heat aging characteristics as compared to CPE. In addition, EVM has better adhesion characteristics as compared to CPE. By combining the CPE and EVM, the combined material has a lower viscosity than CPE alone, making it easier to manufacture; and therefore less expensive to manufacture than hose made of CPE alone. Furthermore, since EVM does not age as quickly as CPE being exposed to elevated temperatures encountered in transmission systems, the blend of EVM and CPE will produce a hose with a longer operational life. A stronger hose results with the addition of EVM to the CPE because the EVM helps the reinforcement layer 14 grip the inner layer 12.

The proportion of CPE and EVM in the inner and outer layers are chosen such that the respective characteristics are balance against one another. A useful ratio of CPE and EVM is between about 3:1 and 1:3 by weight.

The outer layer 16 may be made of any suitable elastomeric material. A useful material is a combination of CPE and EVM which has the same ratio of CPE to EVM as the inner layer 12 does. A hose with such a construction would have a reduced cost because the number of raw materials would be reduced.

Other components may be added to the materials used for the inner 12 and outer 16 layers to tailor the properties of the resultant hose. For example, carbon black can be used to strengthen the inner 12 or outer 16 layers. Other materials can be used to improve processing characteristics to simplify fabrication. In addition, various stabilizers, lubricating agents, cross-linking agents may be used.

The fiber reinforcing layer 14 is formed by braiding or spiraling a sheath around/on the inner layer 12. Suitable synthetic fibers including nylon, polyester or aramid, while suitable natural fibers include cotton. In addition, metal fibers may also be used in forming the reinforcing layer 14. The preferred reinforcing layer is made of aramid fibers.

The transmission hose 10 may be manufactured in any manner known in the art. For example, the inner layer 12 may be formed by extruding the CPE/EVM blend onto a mandrel. Then, the reinforcing layer 14 may be formed on the inner layer 12 by braiding the desired fiber using a conventional braider. Next, material forming the outer layer 16 may be extruded onto the outer surface of the reinforcing layer 14. The three layers of the hose 10 are then formed into an integral structure by solidification through heating, cooling, curing, or other conventional means, after which the-hose 10 is removed from the mandrel. The hose 10 may also be produced without the mandrel. Solidification is generally effected for about 30–60 minutes at a temperature of about 150° C.–160° C.

The transmission system of a motor vehicle includes several pumps, valves, motors, reservoirs which may be fluidly interconnected by the transmission hose 10. Transmission fluid is passed through the hose 10 between the parts of the transmission system in order to effect operation of the motor vehicle transmission. The hose 10 is suitable for use in automobiles, trucks, and watercraft as well as in hydraulic systems generally.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A transmission hose for use in a vehicle comprising:
    an inner layer having a generally tubular shape, the inner layer comprised of a blend of chlorinated polyethylene and polyethylene vinylacetate;
    a reinforcement layer dispose on the inner layer; and
    an outer layer disposed on the reinforcement layer.

2. The transmission hose of claim 1, wherein the outer layer is comprised of a blend of chlorinated polyethylene and polyethylene vinylacetate.

3. The transmission hose of claim 2, wherein the weight ratio of chlorinated polyethylene and polyethylene vinylacetate is about the same in the inner layer and the outer layer.

4. The transmission hose of claim 1, wherein the weight ratio of chlorinated polyethylene to polyethylene vinylacetate is at most about 3.1.

5. The transmission hose of claim 1, wherein the weight ratio of chlorinated polyethylene to polyethylene vinylacetate is about at least 1:3.

6. A transmission hose for use in a vehicle comprising:
    an inner layer having a generally tubular shape, the inner layer comprised of a blend of chlorinated polyethylene and polyethylene vinylacetate, wherein polyethylene vinylacetate comprises between about 25% and about 75% of the blend by weight;
    a reinforcement layer dispose on the inner layer; and
    an outer layer disposed on the reinforcement layer.

7. An article of manufacture comprising:
    an inner layer having a generally tubular shape, the inner layer comprised of a of blend chlorinated polyethylene and polyethylene vinylacetate, wherein polyethylene vinylacetate comprises between about 25% and about 75% of the blend by weight;
    a reinforcement layer dispose on the inner layer; and
    an outer layer disposed on the reinforcement layer;
    wherein the article of manufacture is adapted for use in a vehicle transmission.

* * * * *

UNITED STATES PATENT AND TRADEMARK OFFICE
CERTIFICATE OF CORRECTION

PATENT NO.   : 6,386,239 B1
DATED        : May 14, 2002
INVENTOR(S)  : Marty A. Ramey et al.

It is certified that error appears in the above-identified patent and that said Letters Patent is hereby corrected as shown below:

Column 4,
Line 6, replace "at most about 3.1" with -- at most about 3:1 --.
Line 22, replace "comprised of a of blend" with -- comprised of a blend of --.

Signed and Sealed this

Third day of September, 2002

Attest:

JAMES E. ROGAN
Attesting Officer        Director of the United States Patent and Trademark Office